(No Model.)
G. TOMPKINS.
FOOT RASP FOR HORSES.
No. 450,436. Patented Apr. 14, 1891.
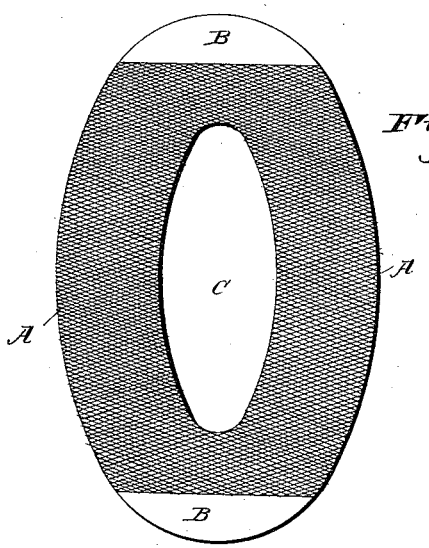
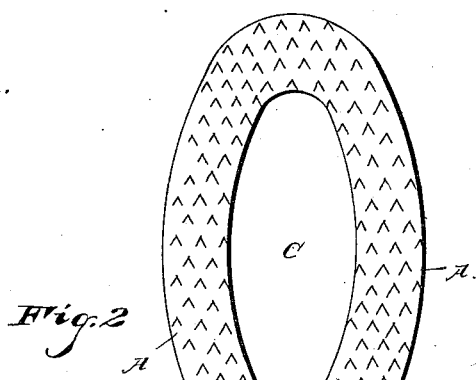
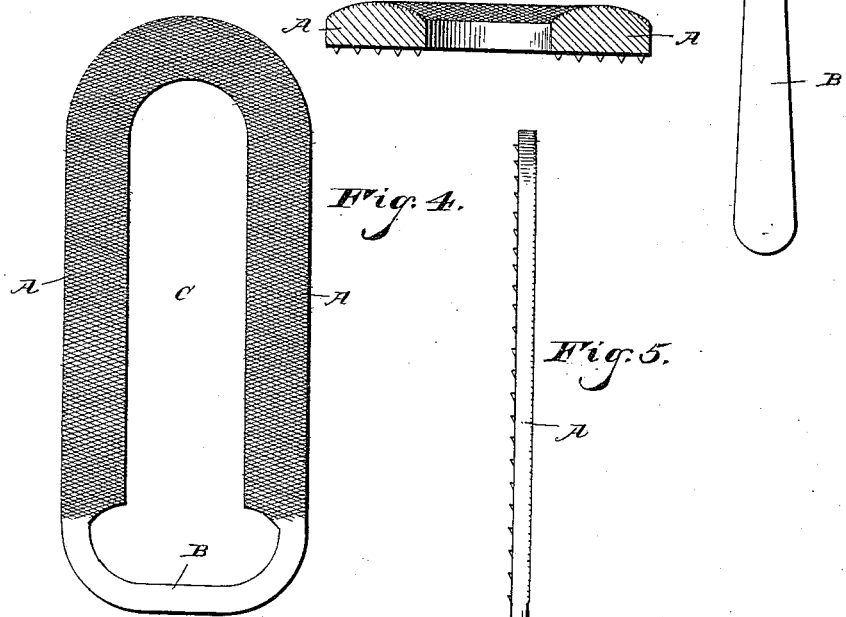
WITNESSES
Samuel Ker.
J. N. Kalb.
INVENTOR
Gilbert Tompkins.

UNITED STATES PATENT OFFICE.

GILBERT TOMPKINS, OF SAN LEANDRO, CALIFORNIA.

FOOT-RASP FOR HORSES.

SPECIFICATION forming part of Letters Patent No. 450,436, dated April 14, 1891.

Application filed July 17, 1890. Serial No. 359,072. (No model.)

*To all whom it may concern:*

Be it known that I, GILBERT TOMPKINS, a citizen of the United States, residing at San Leandro, county of Alameda, and State of California, have invented certain new and useful Improvements in Foot-Rasps for Horses, of which the following is a specification.

My invention relates to foot-rasps or implements for preparing the hoofs of horses to receive the shoes; and it has for its object to provide a hand-tool for leveling the hoof without injuring the frog and for finishing the whole surface at one operation, thereby producing an even bearing-surface to receive the shoe.

To such end my invention consists in the described construction of hand implement having a rasp-surface shaped and adapted to operate on the whole bearing-surface or horny portion of the hoof at the same time, and a central opening that is arranged to clear the frog, and means for grasping and operating it arranged in the plane of the implement.

The following description explains the construction and operation of this hand implement, the accompanying drawings being referred to by letters.

Figure 1 is a face view of one form of the implement, showing the file side. Fig. 2 is a similar view of a modified form of the implement, showing the rasp side. Fig. 3 is a transverse section showing one side rounded. Fig. 4 is a face view of another modification, and Fig. 5 is an edge view.

A is a bar having a rasp-surface shaped to cover the whole thread of the hoof.

B is a handle or means for grasping the implement, arranged in the plane of the bar, and C is an open space to clear the frog of the foot.

There may be a handle or grasping means provided at each end of the implement, as shown in Fig. 1, or only one end need be so provided, as shown in Figs. 2, 4, and 5.

Both faces of the implement may be used, and for this purpose one face will be the usual rasp-surface and the other the usual file-surface, as in the common rasp used by blacksmiths. One face may be flat and the other convex or half-round, as illustrated in Fig. 3, or both surfaces may be flat rasp-surfaces.

In either form of the implement represented in the drawings the central opening should be of sufficient size to clear the frog, and the edge of the opening should be rounded and finished smoothly, so that there may be no danger if the inner edges of the tool strike the frog.

Either form of the tool represented in the drawings can be readily made in one piece.

In using the tool it is laid against the bottom of the hoof and worked backward and forward with a slight circular motion and with an even pressure against the whole bearing-surface.

Having thus fully described my invention, what I claim, and desire to secure by Letters Patent, is—

1. A foot-rasp comprising a bar having a rasp-surface shaped to cover the whole tread of the hoof, an aperture to clear the frog, and means for grasping and operating it arranged in the plane of the bar, as set forth.

2. A foot-rasp comprising a bar having a rasp-surface on one face and a file-surface on the other, shaped to cover the whole tread of the hoof, an aperture to clear the frog, and means for grasping and operating it arranged in the plane of the bar, as set forth.

In testimony that I claim the foregoing I have hereunto set my hand and seal.

GILBERT TOMPKINS. [L.S.]

Witnesses:
CHAS. E. KELLY,
EDWARD E. OSBORN.